United States Patent [19]

Reuter et al.

[11] 4,181,520

[45] Jan. 1, 1980

[54] PROCESS FOR THE DIRECT REDUCTION OF IRON OXIDE-CONTAINING MATERIALS IN A ROTARY KILN

[75] Inventors: Gerhard Reuter; Wolfram Schnabel, both of Frankfurt am Main, Fed. Rep. of Germany

[73] Assignee: Metallgesellschaft Aktiengesellschaft, Frankfurt, Fed. Rep. of Germany

[21] Appl. No.: 952,870

[22] Filed: Oct. 19, 1978

Related U.S. Application Data

[63] Continuation of Ser. No. 647,830, Jan. 9, 1976, abandoned.

[30] Foreign Application Priority Data

Jan. 14, 1975 [DE] Fed. Rep. of Germany ....... 2501182

[51] Int. Cl.$^2$ ............................................. C21B 13/08
[52] U.S. Cl. ............................................. 75/36; 75/3
[58] Field of Search .................... 75/3, 4, 5, 29, 33, 75/34, 35, 36, 37

[56] References Cited

U.S. PATENT DOCUMENTS

| | | | |
|---|---|---|---|
| 3,170,786 | 2/1965 | Moklebust | 75/36 |
| 3,469,970 | 9/1969 | Heitmann | 75/33 |
| 3,486,883 | 12/1969 | Heitmann | 75/36 |
| 3,918,958 | 11/1975 | Heitmann | 75/36 |

FOREIGN PATENT DOCUMENTS 1264452 2/1972 United Kingdom ........................ 75/33
1307869 2/1973 United Kingdom .

OTHER PUBLICATIONS

Merriman, A. D.; *A Dictionary of Metallurgy*; MacDonald & Evans Ltd.; London, p. 27.
Perry, R. H.; *Chemical Engineers Handbook* 4th Edition, McGraw Hill, New York, N.Y. p. 9-3, (1963).

*Primary Examiner*—L. Dewayne Rutledge
*Assistant Examiner*—Michael L. Lewis
*Attorney, Agent, or Firm*—Sprung, Felfe, Horn, Lynch & Kramer

[57] ABSTRACT

Iron oxide-containing materials, such as iron ores, are directly reduced to produce sponge iron by a treatment with solid carbonaceous reducing agents in a rotary kiln at temperatures below the softening and melting point of the charge wherein the kiln atmosphere flows opposite to the direction of movement of the charge. At least part of the solid carbonaceous reducing agent is charged in an agglomerated form into the rotary kiln at the charging end thereof and oxygen containing gases are fed into the rotary kiln. A highly reactive, solid carbonaceous reducing agent containing 20-50% volatile constituents are charged in agglomerated form into the rotary kiln the charging end thereof and are heated up at such a rate that the reducing agent disintegrates into fine particles substantially in and before the end of the heating-up zone of the rotary kiln.

12 Claims, 1 Drawing Figure

U.S. Patent  Jan. 1, 1980  4,181,520
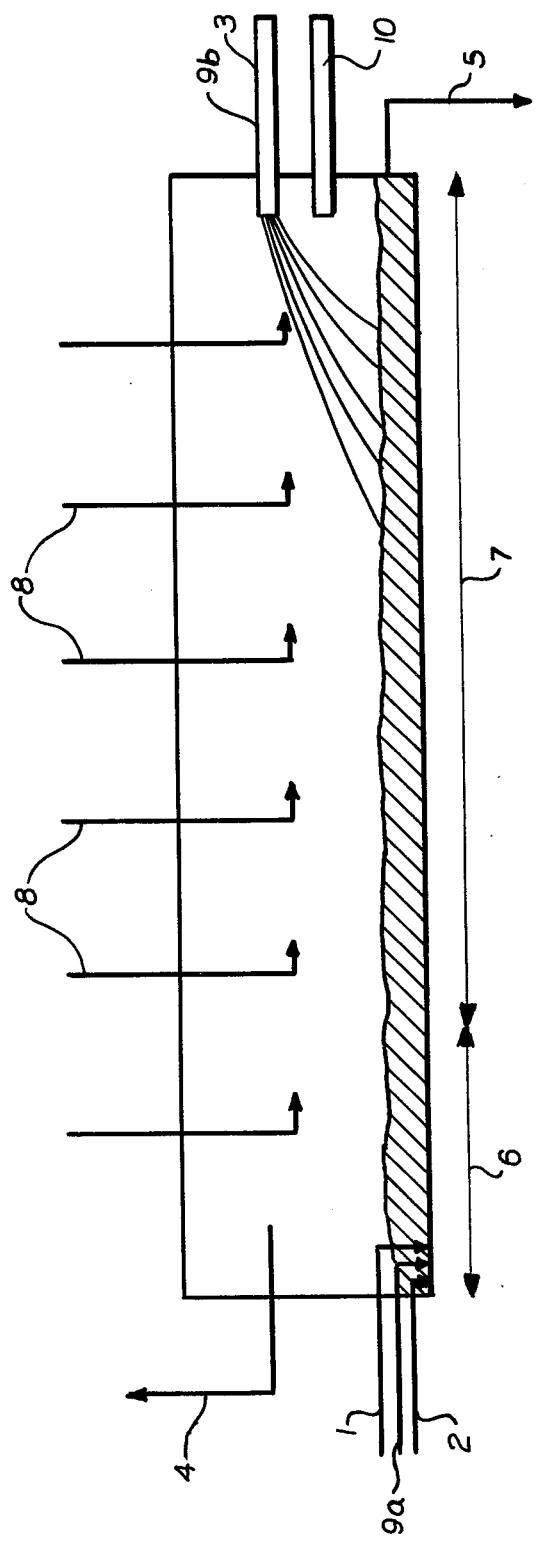

PROCESS FOR THE DIRECT REDUCTION OF IRON OXIDE-CONTAINING MATERIALS IN A ROTARY KILN

This is a continuation of application Ser. No. 647,830, filed Jan. 9, 1976 and now abandoned.

BACKGROUND

This invention relates to a process for the direct reduction of iron oxide-containing materials, preferably iron ores, to produce sponge iron by a treatment with solid carbonaceous reducing agents in a rotary kiln at a temperature below the softening and melting point of the charge, in which the kiln atmosphere flows opposite to the direction of movement of the charge, at least part of the solid carbonaceous reducing agents is charged in agglomerated form into the rotary kiln at the charging end thereof, and oxygen-containing gases are fed into the rotary kiln.

The use of highly reactive solid carbonaceous reducing agents having a high content of volatile constituents has the advantage that the reaction rate is increased, the volatile constituents can be used for the reduction and heat supply in the rotary kiln, and inexpensive reducing agents can be used. On the other hand, the problem arises to enable a utilization in the rotary kiln of those volatile constituents which are released near the charging end and to minimize the quantity of fine-grained reducing agent entrained by the exhaust gas from the rotary kiln.

For this reason, in processes in which such reducing agents are used, at least a considerable part of these reducing agents is blown or thrown into the rotary kiln at the discharge end thereof and is distributed along the rotary kiln over a certain distance (British Pat. No. 1,222,123; British Pat. No. 1,307,869; "Stahl und Eisen", 85, (1965), page 1375; Australian Printed Application No. 423,616). As a result, a large part of the volatile constituents are released in the rear part of the rotary kiln and can be utilized in the rotary kiln. In that process, however, a highly exact, defined and uniform distribution of the reducing agent to the several zones of the rotary kiln is required in order to avoid trouble due to fluctuations of temperature, pressure and gas composition. To ensure the required distribution of the reducting agent, its particle size distribution must be constant. If part of the reducing agent having a high content of volatile constituents is fed into the rotary kiln at the charging end thereof, only part or none of the volatile constituents released in the first part of the rotary kiln can be utilized in the rotary kiln.

It is also known to pelletize the surplus carbonaceous material separated from the material discharged from the kiln and to recycle the pelletized surplus carbonaceous material to the charging end of the rotary kiln. Due to its pelletization, the surplus carbonaceous material resists disintegration in at least part of the length of the kiln and the losses due to solids entrained by the exhaust gases are minimized (British Pat. No. 1,264,452). Whereas this practice results in a reduction of the losses caused by the entrainment of recycled surplus carbon which has been devolatized, it does not constitute a suggestion how the problem described hereinbefore can be solved.

It is known from the U.S. Pat. No. 3,097,090 to charge the rotary kiln with fine-grained coal and with surplus coal in the form of lump coal or coal pellets. The lump coal should form a protective layer covering the surface of the charge and is recycled when it has been screened from the matter discharged from the kiln. A use of highly reactive coal having a high content of volatile constituents is not mentioned and would result in an excessively high content of volatile constituents in the exhaust gas.

It is known from the British Pat. No. 1,110,667 to impregnate coked coal pellets with liquid hydrocarbons and then to charge them into the rotary kilns in zones in which the charge is already at a temperature of at least 600° C. For this reason, the pellets must be blown or thrown into the rotary kiln or fed through the shell thereof.

SUMMARY

This invention provides a technically simple and economic process which enables the use of highly reactive coal having a high content of volatile constituents whereas the above-mentioned disadvantages of the known processes are avoided. Specifically, the volatile constituents are utilized to a high degree in the rotary kiln, the losses of solid reducing agent due to entrainment by the exahust gases are minimized, and a uniform operation of the kiln and high throughput rates are achieved.

This is accomplished according to the invention in that highly reactive, solid carbonaceous reducing agents which contain 20-50% by weight volatile constituents are charged in agglomerated form into the rotary kiln at the charging end thereof and are heated up at such a rate that they disintegrate into fine particles substantially in and before the end of the heating-up zone of the rotary kiln.

DESCRIPTION

The oxygen-containing gases—generally air—may be blown in by means of shell tubes, which are spaced along the kiln, and/or in a jet from the discharge end of the rotary kiln. Preferred highly reactive solid carbonaceous reducing agents which contain 20-50% volatile constituents are brown coal and subbituminous coal. The reducing agent may be agglomerated by being pelletized or briquetted. The agglomerates having preferably a particle size in the range of about 1-7 cm. Fragments of agglomerates may also be used. The disintegration of the agglomerates in and before the end of the heating-up zone of the rotary kiln is controlled in such a manner that the disintegration takes place throughout the length of the heating-up zone whereas a complete disintegration of all agglomerates in the initial portion of the heating-up zone is avoided. The reducing zone begins approximately at that point of the rotary kiln where the temperature of the charge has reached the reducing temperature and remains virtually constant. It will be understood that a reduction resulting in lower iron oxides takes place even before the reducing zone thus defined. The disintegration in the heating-up zone should result in a particle size which is desirable for the reduction, i.e., which is as small as possible, below 5 mm and in any case below 8 mm. A small disintegration or continued disintegration in the reducing zone is not disturbing.

According to a preferred feature of the invention, the highly reactive solid carbonaceous reducing agents are charged in the form of briquettes into the rotary kiln at the charging end thereof. Briquettes are highly suitable and can be made more economically than pellets because the reducing agents which are used can be briquetted without binders when they have the particle size which results from drying and they need not be disintegrated to pelletizable particles and be pelletized with addition of binders. The briquetting may be effected at the temperature at which the coal is discharged from the dryer or to which the coal cools down before entering the presses. The briquettes leaving the presses are at a temperature of about 40°–60° C. Cylindrical briquettes are preferred.

According to a further feature of the invention, part of the solid carbonaceous reducing agent is blown into the rotary kiln at the discharge end thereof in the direction of flow of the kiln atmosphere. In this way, the sponge iron product can be protected in the final part of the reducing zone even if only a very small amount of residual carbon is left in the charge. Only a small required surplus of carbon is required in the discharge material in this case.

According to a further feature, the agglomerated solid carbonaceous reducing agent has a particle size of 1–7 cm. This particle size range results in very good operating conditions.

According to a further feature, the agglomerated reducing agent is heated up in the heating-up zone of the rotary kiln at a rate of 7°–15° C./min, preferably 9°–12° C./min. At this heating-up rate, the agglomerates of the reducing agent are devolatilized at a lower rate than the same reducing agent when it is not agglomerated. This results in a more uniform devolatilization throughout the heating-up zone and in a smaller heat consumption. A heating-up rate in this range results also in a particularly desirable disintegration of the agglomerated reducing agent and in lower losses due to a formation of dust and burning.

According to a preferred feature, the charge is at a temperature of 900°–950° C. in the reducing zone. Most of the volatile constituents of the agglomerates of the reducing agent are released up to this temperature range so that the $H_2$ content of the degasified reducing agent reaches its maximum when the reducing zone is reached. In the reducing zone, the reducing agent is gasified and the gasification products are optimally utilized for the reduction in the reducing zone. These temperatures result also in a low-temperature coke having a sufficiently high strength for its continued movement in the reducing zone of the kiln.

According to a preferred feature, the carbon contained in the matter discharged from the rotary kiln amounts to less than 2% by weight, preferably less than 1% by weight, of the quantity of iron oxide-containing material which has been charged. This simplifies the separation of surplus carbon from the material which has been discharged or eliminates the need for such separation. Any separated carbonaceous material can be recycled into the rotary kiln.

According to a preferred feature, a solic carbonaceous reducing agent of low reactivity is charged into the rotary kiln in a quantity of up to about 0.1% by weight carbon per 1% by weight Fe in the iron oxide-containing material which is charged. The reducing agent of low reactivity may be charged into the rotary kiln at the charging end thereof or may be blown in at the discharge end. The reducing agent of low reactivity is circulated almost without losses due to burning and formation of dust. This practive avoids a depletion of carbon in the charge in the final part of the rotary kiln and permits of the use of only a small surplus of carbon required for the sake of safety.

According to a preferred feature, a reducing flame is maintained in the final portion of the reducing zone. This permits also of the use of only a small surplus of carbon required for the sake of safety. The reducing flame may be produced by a central burner which is fed with oil or gas and with a deficiency of air.

According to a preferred feature, at least 80% of highly reactive solid carbonaceous reducing agent are charged in agglomerated form into the rotary kiln at the charging end thereof. Particularly good operating conditions result from that practice.

The advantages of the invention reside in that highly reactive solid carbonaceous reducing agents are used in an economical and technically simple manner and an optimum utilization of the volatile constituents in the rotary kiln is enabled, the losses due to dust entrained by the exhaust gases are small, and optimum operating conditions in conjunction with a high throughput rate can be obtained.

The following examples are intended to further illustrate the present invention without limiting same in any manner.

EXAMPLES

The apparatus used includes a charging system, rotary kiln, rotary cooler, dressing and separation system for the kiln discharge, plant dedusting and waste gas treatment system.

The raw materials were delivered from the storage place on a belt conveyor into a screening system and from there into bins. The material discharged from the bins was measured by conveying scales. The reducing agent could be charged into the charging end and into the discharging end of the rotary kiln.

The rotary kiln had the following data:

| | |
|---|---|
| length | 50 m |
| outside diameter | 3.6 m |
| inside diameter | 3.14 m |
| inclination | 1.5% |
| filling degree at the charging end | 21% |
| filling degree at the discharging end | 17.5% |
| range of revolution | 0.4–1.2 rpm |

The reduction process was carried out with counter-current between the movement of the solid charge and the flow of the kiln atmosphere.

The temperature profile in the kiln was established by means of shell tubes distributed over the length of the kiln through which air was blown into the kiln in regulated amounts. A central burner and a pneumatic feeding device for fine grained coal were provided at the discharge end.

The kiln temperatures were measured by thermocouples projecting through the shell into the kiln. Samples of the kiln charge were taken through the shell by spouts to determine the behaviour of the material and the course of the reduction.

The hot material discharged from the kiln was cooled in a rotary cooler which was sealed against the atmosphere and sparayed with water on the outside.

| Characteristics of the feed materials | |
|---|---|
| Itabira ore pellets: Particle size 10–16 mm | |
| analysis: | |
| Fe total | 65.98% |
| FeO | 0.099% |
| $Fe_2O_3$ | 94.22% |
| $SiO_2$ | 2.5% |
| CaO | 1.43% |
| MgO | 0.43% |
| $Al_2O_3$ | 0.79% |
| $TiO_2$ | 0.036% |
| Mn | 0.039% |
| P | 0.023% |
| S | 0.009% |
| Brown coal briquettes: Particle size 63.5 mm | |
| $H_2O$ | 15.80% |
| ash (waf) | 5.23% |
| C-fix | 36.98% |
| volatiles | 40.90% |
| S | 0.33% |
| calorific value ($H_\mu$) | 4558 kcal/kg |
| ash softening point | 1195° C. |
| ash fusion point | 1235° C. |
| ash melting point | 1285° C. |

During transport to the rotary kiln the pellets and briquettes partly disintegrated. The actual feed had the following particle size distribution:

| Itabira ore pellets: | | | Brown coal briquettes: | | |
|---|---|---|---|---|---|
| | + 16 mm | 2.2% | | + 16 mm | 68.1% |
| 12.5 | − 16 mm | 21.5% | 10 | − 16 mm | 3.1% |
| 10 | − 12.5 mm | 34.4% | 8 | − 10 mm | 1.4% |
| 8 | −10 mm | 15.0% | 5 | − 8 mm | 2.6% |
| 6.4 | − 8 mm | 9.2% | 3.15 | −5.0 mm | 2.5% |
| 3.15 | − 6.4 mm | 10.7% | 1 | − 3.15 mm | 12.2% |
| 1 | − 3.15 mm | 3.4% | | − 1.0 mm | 10.1% |
| 0.5 | − 1 mm | 0.2% | | | |
| 0.5 | | 3.4% | | | |

| Test conditions (first run): | |
|---|---|
| feed: | |
| ore pellets | 12.0 metric ton per hour (t/h) |
| cylindrical briquettes | 9.5 t/h |
| temperatures: | |
| reduction zone | 930°–940° C. |
| kiln revolution | 0.7 rpm |
| retention time of charge in the kiln | about 7 hours |
| length of heating zone by 10° C. min | 20–25% of the total kiln length |
| mean particle size ratio of ore pellets to coal: | |
| at the charging end | $\frac{\text{pellets diameter}}{\text{coal diameter}} = 0.5$ to $0.7$ |
| behind the heating zone | $\frac{\text{pellets diameter}}{\text{coal diameter}} = 2$ to $3$ |
| | 80% coal below 5 mm (determined by samples taken through the shell) |
| ratio of fixed-carbon to Fe: | |
| at the charging end | 0.44 |
| in the discharge | 0.22 to 0.04 |
| test conditions (second run): | |
| feed: | |
| ore pellets | 8.0 t/h |
| cylindrical briquettes | 7.0 t/h |
| coke breeze (80 weight % with 4–6 mm) | 0.5 t/h |
| coal in the kiln discharge | 0.5 t/h |
| temperatures: | |
| reduction zone | 930° to 940° C. bed temperature 1000° C. gas temperature |
| kiln revolution | 0.7 rpm |
| retention of charge in the kiln | about 7 hours |
| length of heating zone | 20–25% of the total kiln length |
| mean particle size ratio of ore pellets to coal: | |
| at the charging end | $\frac{\text{pellets diameter}}{\text{coal diameter}} = 0.5$ to $0.7$ |
| behind the heating zone | $\frac{\text{pellets diameter}}{\text{coal daimeter}} = 2$ to $3$ |
| ratio of fixed-carbon to Fe: | |
| at the charging end | 0.45 |
| behind the heating zone | 2.0 to 3.0 |
| | 80% coal below 5 mm (determined by samples taken through the shell) |
| in the kiln discharge | 0.08 |

In the first test run the dust loss of solid fixed carbon entrained in the waste gas was 20 grams per standard cubic meter. In a comparative test run but with feeding brown coal in unbriquetted form the dust loss was 38 grams per standard cubic meter.

In the second test run the dust loss of solid fixed carbon entrained in the waste gas was 15 grams per standard cubic meter. In a comparative test run but with feeding brown coal in unbriquetted form the dust loss was 32 grams per standard cubic meter.

According to the invention the dust loss of solid fixed carbon in the waste gas is decreased to 30–60% of that of the prior art. The loss of volatile matter contained in the solid carbonaceous material entrained in the waste gas is also decreased accordingly.

The points at which the various materials can be charged into the rotary kiln are shown schematically in the drawing.

1: ore pellets
2: agglomerated solid carbonaceous reducing agent containing 20–50% volatile constituents.
3: pneumatically fed solid carbonaceous reducing agent containing a high content of volatile constituents
4: waste gas
5: kiln discharge
6: heating zone
7: reducing zone
8: shell tubes for introducing oxygen-containing gas
9a: solid carbonaceous reducing agent of low reactivity
9b: pneumatically fed solid carbonaceous reducing agent of low reactivity.

What is claimed is:

1. Process for the direct reduction of iron oxide-containing materials to produce sponge iron which comprises treating the iron oxide-containing-materials with separate solid carbonaceous reducing agents in a rotary kiln at a temperature below the softening and melting point of the charge, the kiln atmosphere flowing opposite to the direction of movement of the charge, at least part of the said solid carbonaceous reducing agents being charged in agglomerated form into the rotary kiln at the charging end thereof, feeding oxygen-containing gases into the rotary kiln, charging said highly reactive, solid carbonaceous reducing agents which contain 20–50% volatile constituents in agglomerated form and are capable of being consumed to an extent of at least about 98% into the rotary kiln at the charging end thereof and heating same up at such a rate that the said reducing agents disintegrate into fine particles substantially in and before the end of the heating-up zone of the rotary kiln and wherein the carbon contained in the matter discharged from the rotary kiln amounts to less than 2% by weight, by weight of the quantity of iron oxide-containing material which has been charged.

2. Process of claim 1 wherein the highly reactive solid carbonaceous reducing agents are charged in the form of briquettes into the rotary kiln at the charging end thereof.

3. Process of claim 1 wherein part of the solid carbonaceous reducing agent is blown into the rotary kiln at the discharge end thereof in the direction of flow of the kiln atmosphere.

4. Process of claim 1 wherein the agglomerated solid carbonaceous reducing agent has a particle size of 1–7 cm.

5. Process of claim 1 wherein the agglomerated reducing agent is heated up in the heating-up zone of the rotary kiln at a rate of 7°–15° C./min.

6. Process of claim 5 wherein the reducing agent is heated up in the heating-up zone of the rotary kiln at a rate of 9°–12° C./min.

7. Process of claim 1 wherein the charge is at a temperature of 900°–950° C. in the reducing zone.

8. Process of claim 1 wherein a solid carbonaceous reducing agent of low reactivity is charged into the rotary kiln in a quantity of up to about 0.1% by weight carbon per 1% by weight iron in the iron-oxide-containing material which is charged.

9. Process of claim 1 wherein a reducing flame is maintained in the final part of the reducing zone.

10. Process of claim 1 wherein at least 80% of highly reactive solid carbonaceous reducing agent are charged in agglomerated form into the rotary kiln at the charging end thereof.

11. Process of claim 1 wherein the carbon contained in the matter discharged from the rotary kiln amounts to less than 1% by weight of the quantity of iron oxide-containing material which has been charged.

12. Process of claim 1 wherein the iron-oxide-containing materials are iron ores.

* * * * *